(12) United States Patent
Wisniewski

(10) Patent No.: US 9,382,702 B2
(45) Date of Patent: Jul. 5, 2016

(54) SINK FASTENER FOR FASTENING A SINK UNIT TO A COUNTERTOP

(71) Applicant: Franke Technology and Trademark Ltd., Hergiswil (CH)

(72) Inventor: Colin Wisniewski, Barrie (CA)

(73) Assignee: Franke Technology and Trademark Ltd., Hergiswil (CH)

( * ) Notice: Subject to any disclaimer, the term of this patent is extended or adjusted under 35 U.S.C. 154(b) by 171 days.

(21) Appl. No.: 13/926,017

(22) Filed: Jun. 25, 2013

(65) Prior Publication Data

US 2014/0007341 A1     Jan. 9, 2014

(51) Int. Cl.
*E03C 1/33* (2006.01)
*F16B 21/18* (2006.01)

(52) U.S. Cl.
CPC .............. *E03C 1/335* (2013.01); *F16B 21/183* (2013.01)

(58) Field of Classification Search
CPC ..................................... E03C 1/33; E03C 1/32
USPC ....................................................... 4/633–634
See application file for complete search history.

(56) References Cited

U.S. PATENT DOCUMENTS

| 3,095,580 | A | * | 7/1963 | Just | E03C 1/33 |
| | | | | | 4/633 |
| 3,312,983 | A | * | 4/1967 | Jansson et al. | 4/650 |
| 6,216,992 | B1 | | 4/2001 | Bisonaya et al. | |
| 6,785,918 | B2 | | 9/2004 | Romo | |

FOREIGN PATENT DOCUMENTS

| CA | 2292304 | | 9/2000 |
| CA | 2292304 | A1 * | 9/2000 |
| EP | 0674055 | | 9/1995 |

* cited by examiner

*Primary Examiner* — Huyen Le
*Assistant Examiner* — Christine Skubinna
(74) *Attorney, Agent, or Firm* — Volpe and Koenig, P.C.

(57) ABSTRACT

A sink fastener for fastening a sink unit with an outer flange within an opening in a countertop is provided. The sink fastener includes a frame for attachment to a bowl wall of the sink unit, a threaded vertical bolt rotatably mounted within the frame, a claw member having a lateral portion threadably mounted on the vertical bolt and an upstanding retainer portion, and a guide member for constraining the movement of the claw member. In use, rotation of the vertical bolt causes the claw member to rise up the bolt to engage an underside of the countertop, and in a lower disengaged position the claw member is free to turn about a vertical axis into a retracted position wherein the claw member lies constrained under the flange to permit insertion of the sink unit into the countertop opening. The guide member ensures that as the claw member rises up the bolt the claw member turns about the vertical axis into a constrained outwardly extended position for engagement with the underside of the countertop.

10 Claims, 23 Drawing Sheets

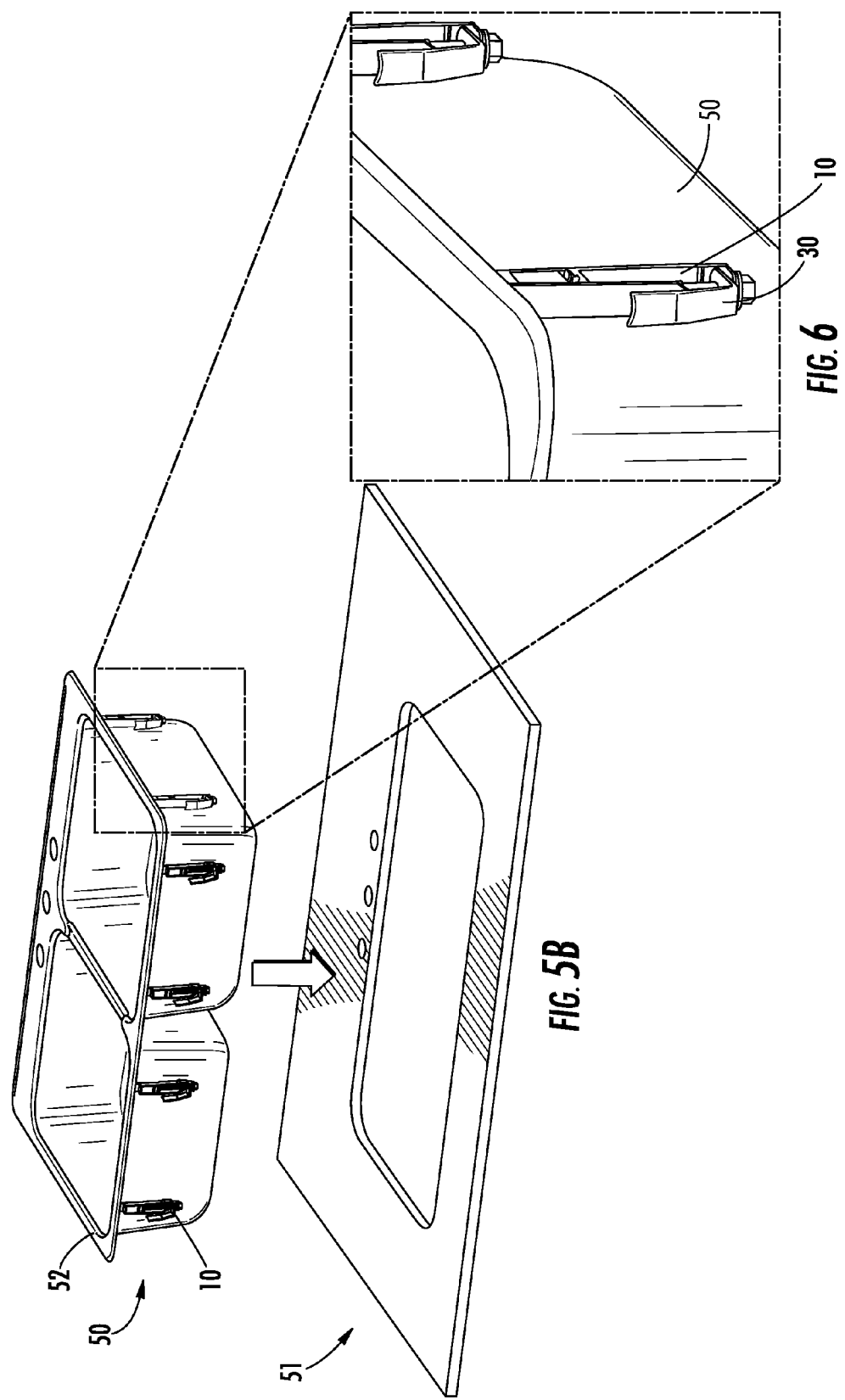

DETAIL B

SECTION A-A

NOTES:
1. PART TO BE FREE OF FLASH, CONTAMINATION, AND PHYSICAL DEFECTS.
2. MATERIAL-POLYPROPYLENE (BLACK)

| UNSTATED TOLERANCES ||||||||
|---|---|---|---|---|---|---|---|
| LINEAR: (DIN ISO 2768 T1) |||||| ANGULAR (DIN 6935) ||
| > | ≤ | F (FINE) | M (MEDIUM) | C (COURSE) | V (VERY COURSE) | | |
| 0.5 | 3 | ±0.05 | ±0.1 | ±0.2 | ---- | > | ≤ |
| 3 | 6 | ±0.05 | ±0.1 | ±0.3 | ±0.5 | 0° | 30° | ±2°00' |
| 6 | 30 | ±0.10 | ±0.2 | ±0.5 | ±1.0 | 30° | 50° | ±1°45' |
| 30 | 120 | ±0.15 | ±0.3 | ±0.8 | ±1.5 | 50° | 80° | ±1°30' |
| 120 | 400 | ±0.20 | ±0.5 | ±1.2 | ±2.5 | 80° | 120° | ±1°15' |
| 400 | 1000 | ±0.30 | ±0.8 | ±2.0 | ±4.0 | 120° | | ±1°00' |
| 1000 | 2000 | ±0.50 | ±1.2 | ±3.0 | ±6.0 | | | |

FIG. 14C

NOTES:
1. PART TO BE FREE OF FLASH, CONTAMINATION, AND PHYSICAL DEFECTS.
2. MATERIAL-POLYPROPYLENE (BLACK)

| UNSTATED TOLERANCES ||||||||
| LINEAR: (DIN ISO 2768 T1) ||||| ANGULAR (DIN 6935) |||
| > | ≤ | F (FINE) | M (MEDIUM) | C (COURSE) | V (VERY COURSE) | | | |
| 0.5 | 3 | ±0.05 | ±0.1 | ±0.2 | ---- | > | ≤ | |
| 3 | 6 | ±0.05 | ±0.1 | ±0.3 | ±0.5 | 0° | 30° | ±2°00' |
| 6 | 30 | ±0.10 | ±0.2 | ±0.5 | ±1.0 | 30° | 50° | ±1°45' |
| 30 | 120 | ±0.15 | ±0.3 | ±0.8 | ±1.5 | 50° | 80° | ±1°30' |
| 120 | 400 | ±0.20 | ±0.5 | ±1.2 | ±2.5 | 80° | 120° | ±1°15' |
| 400 | 1000 | ±0.30 | ±0.8 | ±2.0 | ±4.0 | 120° | | ±1°00' |
| 1000 | 2000 | ±0.50 | ±1.2 | ±3.0 | ±6.0 | | | |

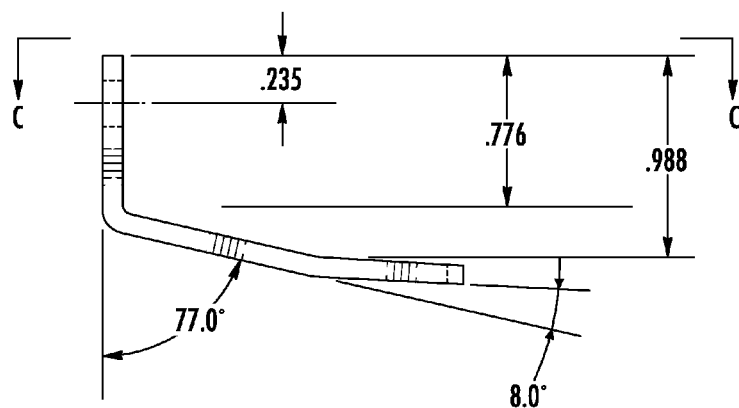
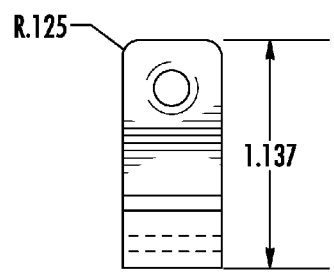
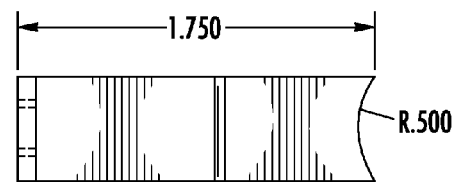
VIEW C-C
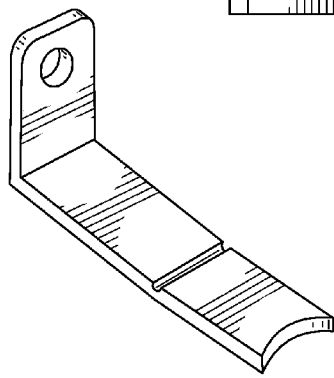
FIG. 16

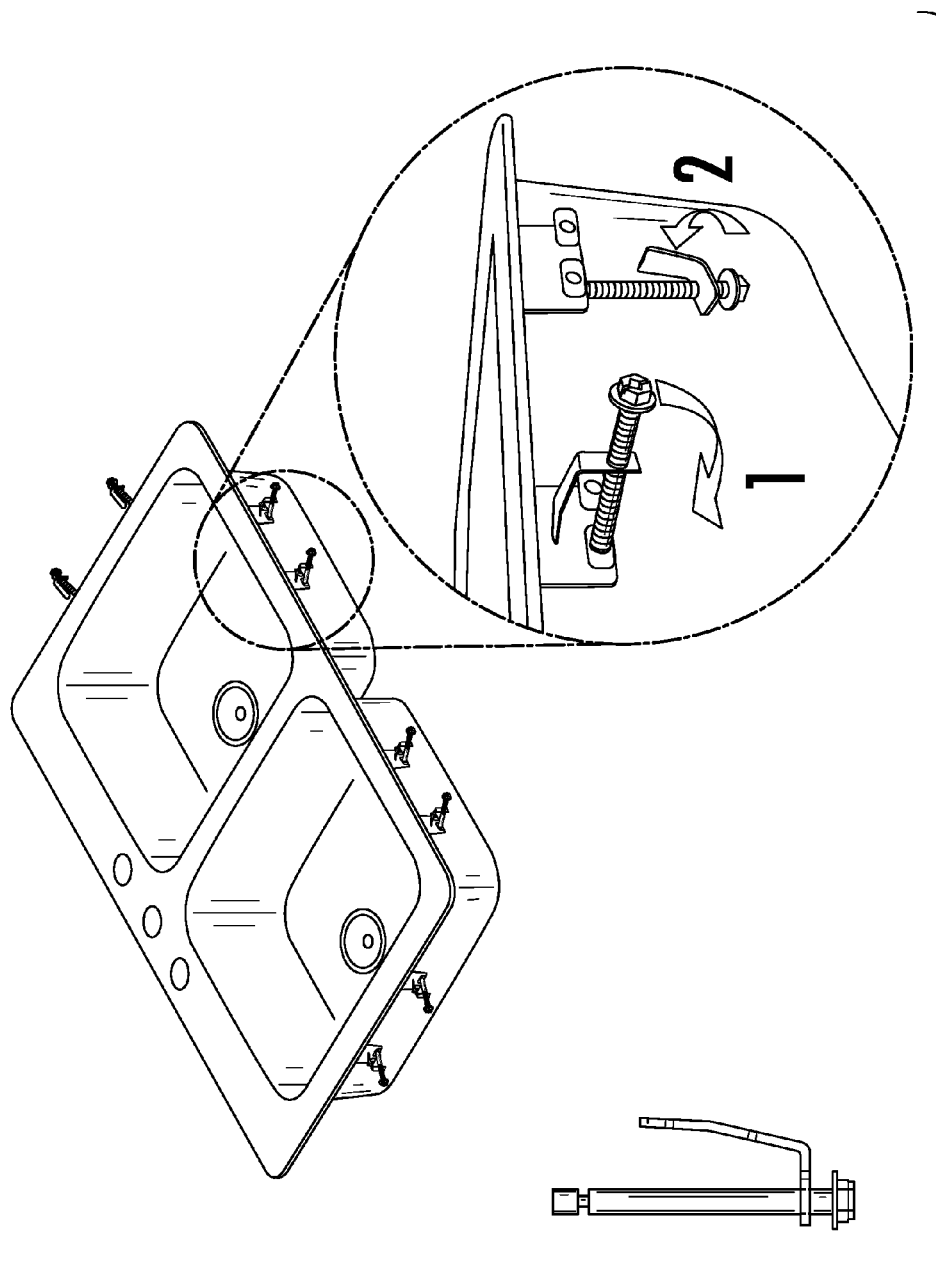

SINK FASTENER FOR FASTENING A SINK UNIT TO A COUNTERTOP

INCORPORATION BY REFERENCE

The following documents are incorporated herein by reference as if fully set forth: Canadian Patent Application No. 2,782,113, filed Jul. 3, 2012.

FIELD OF THE INVENTION

The present invention relates to fasteners. More specifically, the present invention relates to sink fasteners for fastening a sink unit having an outer flange within an opening in a countertop.

BACKGROUND OF THE INVENTION

Typically, residential and commercial sinks include an outer flange that rests upon the top surface of a counter. A fastening structure is used to attach the sink to the countertop. Various types of fastening structures are available.

One such system is seen in FIG. 18. In this system, fasteners are inserted into a sink bracket by an installer. This is generally a 2-stage operation. The claw and the sink bolt are free to move and rotate. This makes it difficult for the sink to pass through a cutout in the countertop, and also requires both hands to tighten the fastener when installing a sink to the countertop. Generally, one hand is required to hold the fastener and the other to drive the bolt.

SUMMARY OF THE INVENTION

A new sink fastener for fastening a sink unit having an outer flange within an opening in a countertop is disclosed. Embodiments of the invention permit one handed operation to install.

Disclosed is a sink fastener for fastening a sink unit with an outer flange within an opening in a countertop, comprising a frame for attachment to a ball wall of the sink unit; a threaded vertical bolt rotatably mounted within the frame and allowing provision for rotation of the bolt; a claw member having a lateral portion threadably mounted on the vertical bolt and an upstanding retainer portion, wherein rotation of the vertical bolt causes the claw member to rise up the bolt to engage an underside of the countertop, and wherein in a lower disengaged position the claw member is free to turn about a vertical axis into a retracted position wherein the claw member lies under the flange to permit insertion of the sink unit into the countertop opening; and a guide member for constraining the movement of the claw member so that as the claw member rises up the bolt the claw member turns about the vertical axis into an outwardly extended position for engagement with the underside of the countertop.

In one embodiment, when the sink unit is in the countertop opening, the threaded vertical bolt is rotated to move the claw member.

In one embodiment, the frame has a keyhole corresponding to a keyhole stud on the sink unit wall to permit attachment of the frame to the wall of the sink unit bowl. Preferably, a stud retention clip is used to lock the attached sink fastener in place.

In one embodiment, the bolt is rotated using either a power drill with driver bit, or a screwdriver. In one embodiment, the fastener further comprises a spring tab at one end of the frame to register against the sink unit flange to ensure that the fastener remains in position at both ends thereof to the frame.

In one embodiment, the bolt is fixed at both ends within the frame to permit one-handed operation. In one embodiment, the guide member is in the form of side walls that guide the claw member during rotation thereof.

In one embodiment, the sink fastener is factory installed to the sink unit. Preferably, there are multiple sink fasteners mounted to the sink unit.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein:

FIG. 1b illustrates the sink fastener of FIG. 1a;

FIG. 5b illustrates how the sink unit of FIG. 5a fits within the opening of a countertop;

FIG. 6 illustrates a close up view of one sink fastener of FIG. 1 attached to the sink unit of FIG. 2;

FIGS. 13a-c, 14A-C, 15A-B, 16, and 17 illustrates some possible, non-limiting dimensions of various elements of the sink fastener in accordance with the teachings of this invention; and FIG. 18 illustrates a prior art system for attaching a sink unit to a countertop.

DETAILED DESCRIPTION OF THE PREFERRED EMBODIMENTS

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

Figure 1A:
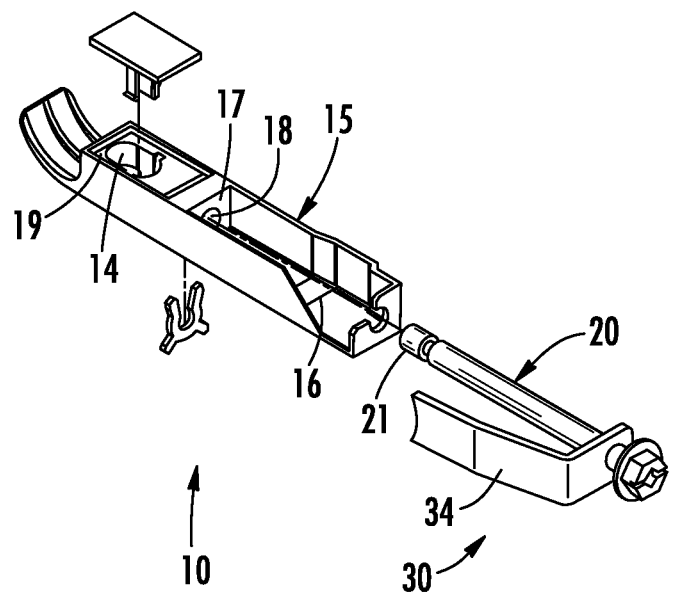
FIG. 1a illustrates an exploded view of one embodiment of a sink fastener in accordance with the teachings of this invention.
Figure 1B:
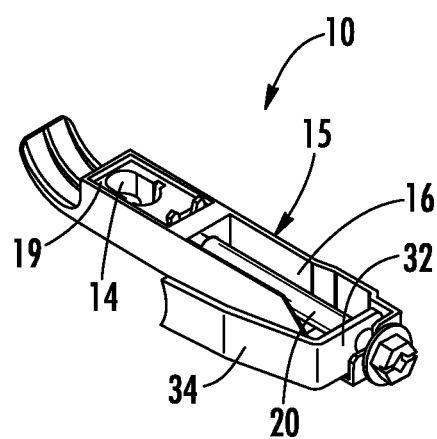
Figure 2:
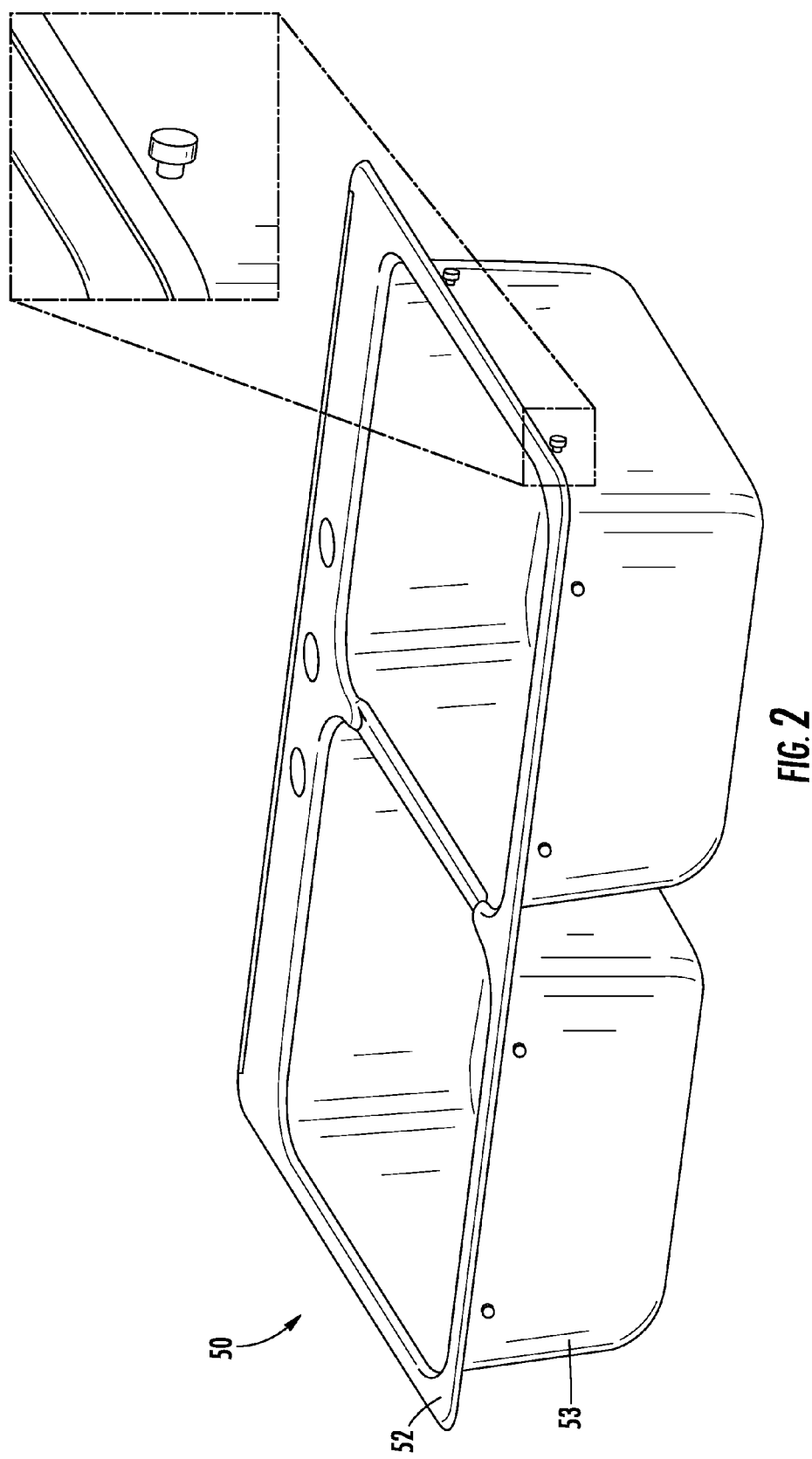
FIG. 2 illustrates a sink unit with outer flange that the sink fastener of FIG. 1 can be used to mount to a countertop.
Figure 5A:
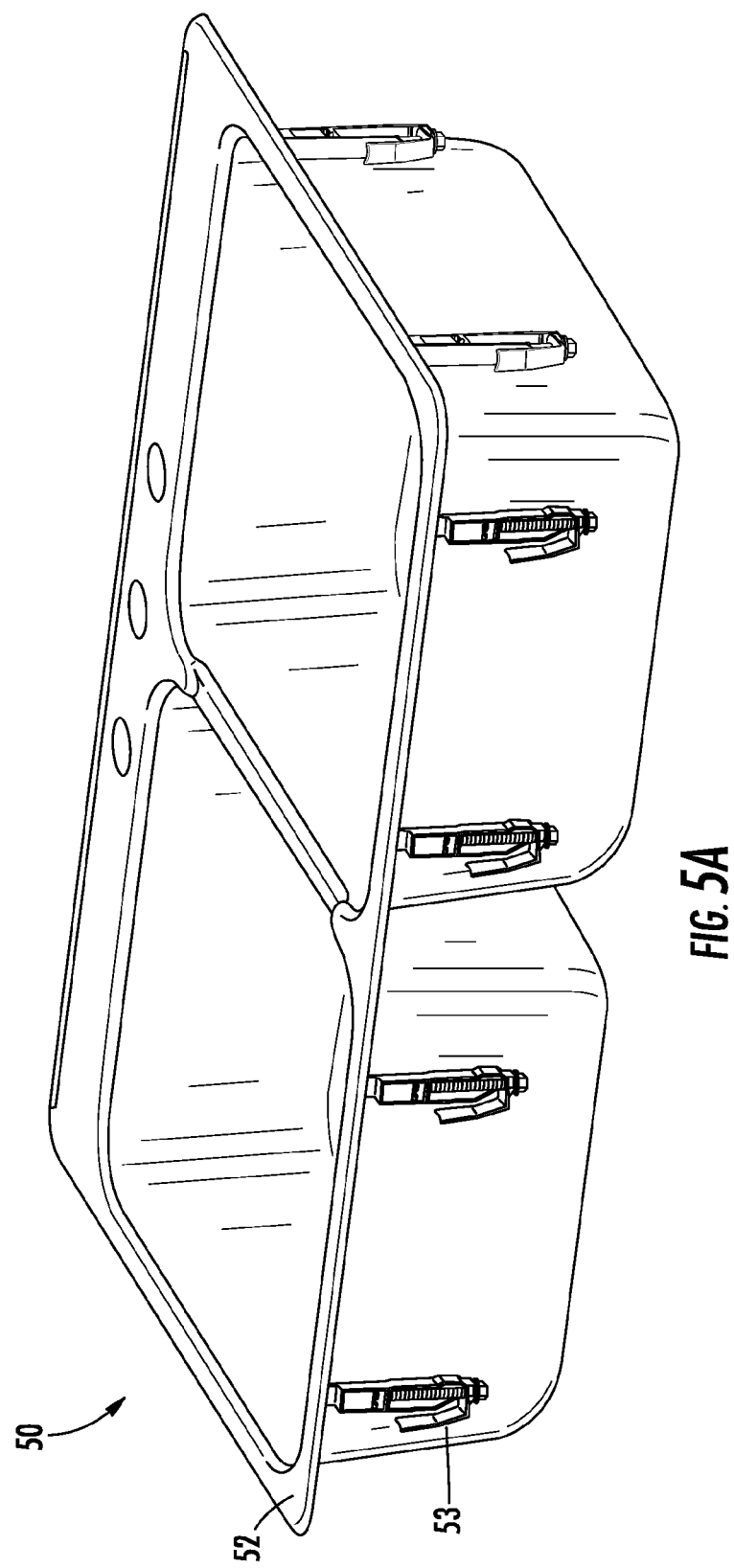
FIG. 5a illustrates the sink unit of FIG. 2 with multiple sink fasteners of FIG. 1 mounted thereto.

Referring to FIGS. 1a and 1b, there is shown a sink fastener 10 for fastening a sink unit (50, FIG. 2) within the opening of a countertop (51, FIG. 5b) in accordance with the teachings of this invention. Embodiments of the invention are intended to be used with sink units 50 having an outer flange (52, FIG. 2). Such a sink unit 50 is seen in FIG. 2. A number of sink fasteners 10 are intended to be mounted to the bowl wall (53, FIG. 2) of the sink unit 50 at an appropriate spacing therebetween, as seen in FIG. 5a. The mounting thereof is discussed in detail below.

Figure 3:
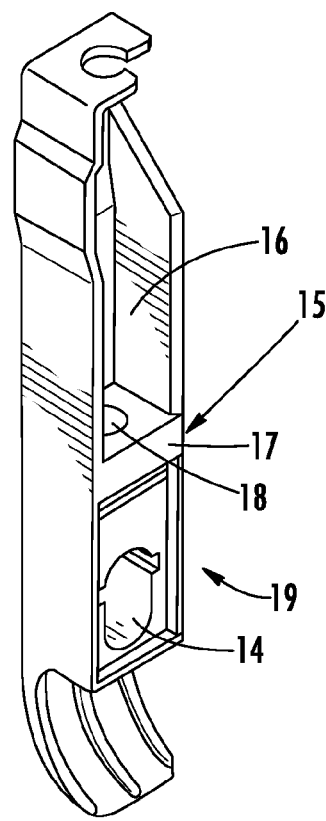
FIG. 3 illustrates one embodiment of a frame of a sink fastener in accordance with the teachings of this invention.
Figure 14A:
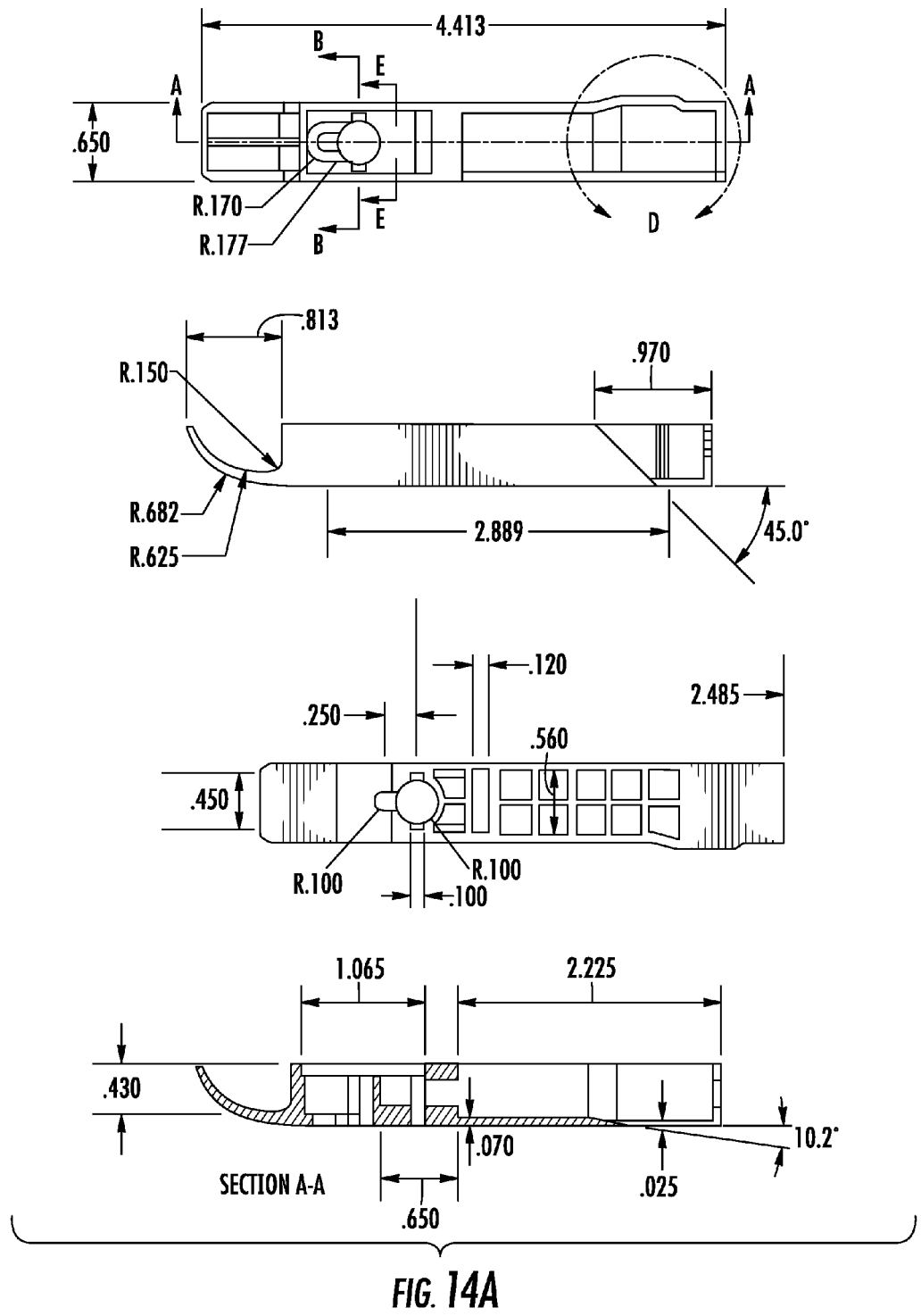
Figure 14B:
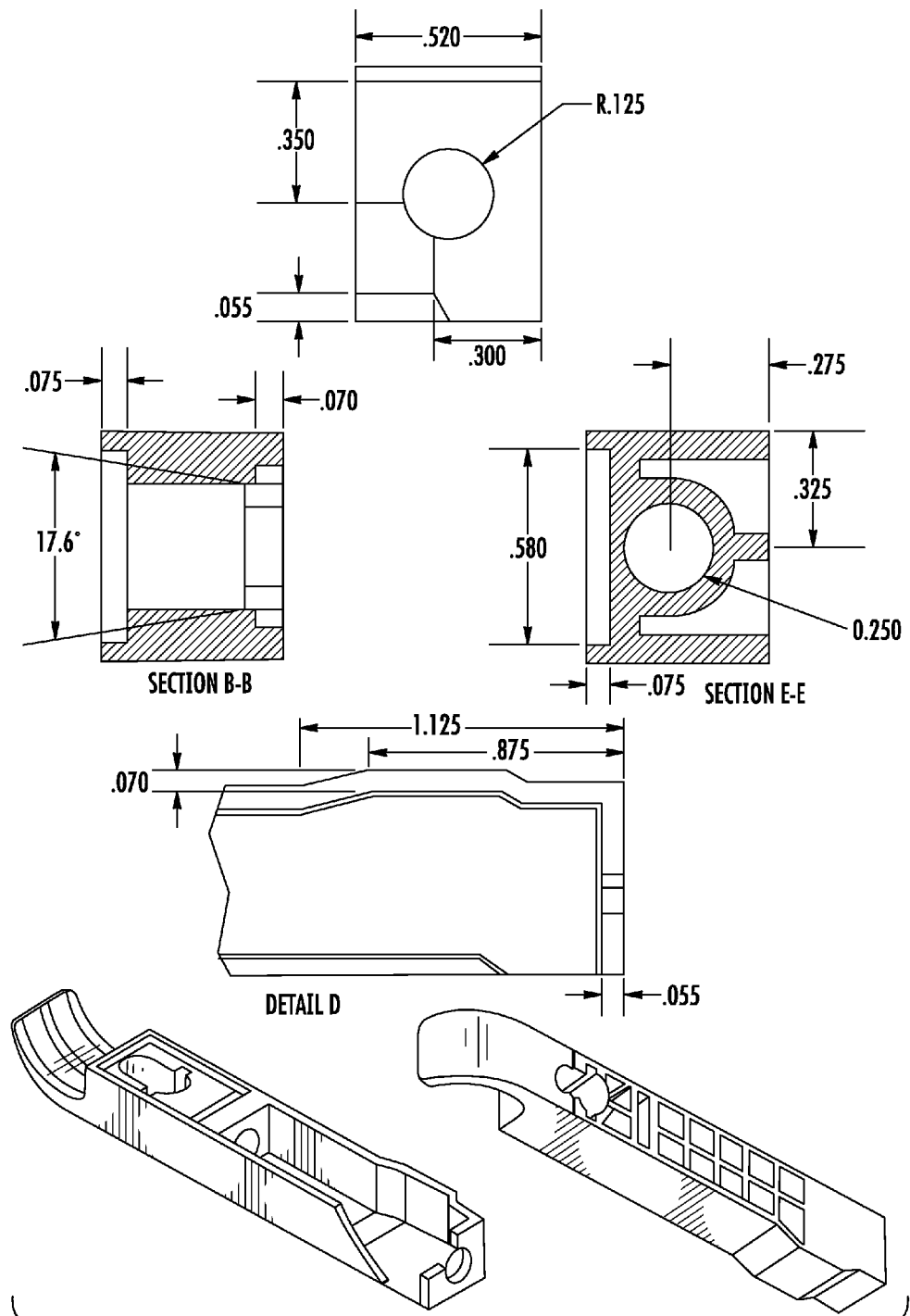

Referring again to FIGS. 1a and 1b, it can be seen that the sink fastener 10 has a frame 15 for attachment to a bowl wall 53 of the sink unit 50. FIG. 3 illustrates the frame 15 in more detail. FIGS. 14A-C illustrates some possible, non-limiting dimensions of the sink fastener 10. The fastener 10 defines a channel 16 therein terminating at a plate 17 with a hole 18. The far end 19 of the frame 10 defines a keyhole 14. The use of these elements is discussed below.

Figure 17:
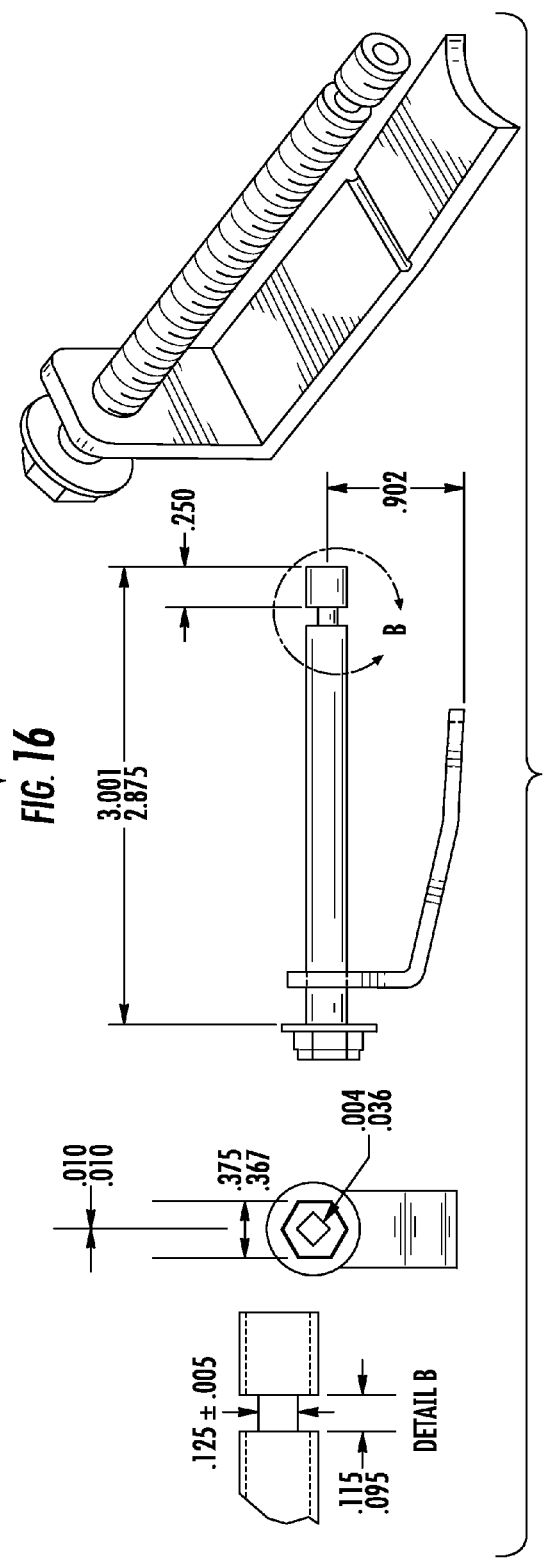

Also seen in FIGS. 1a and 1b, there is a threaded vertical bolt 20 rotatably mounted within the channel 16 of the frame 15. The hole 18 in the plate is sized and shaped to receive the end 21 of the threaded vertical bolt 20 in use. A split retaining ring 22 is used to secure the bolt 20 with frame 15. FIG. 17 illustrates some possible dimensions for the bolt.

Figure 4:
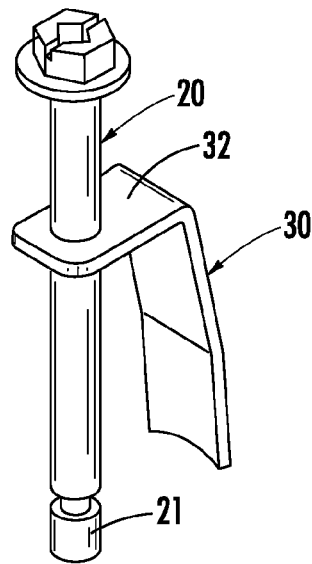
FIG. 4 illustrates one embodiment of a threaded bolt and claw of a sink fastener in accordance with the teachings of this invention.
Figure 16:
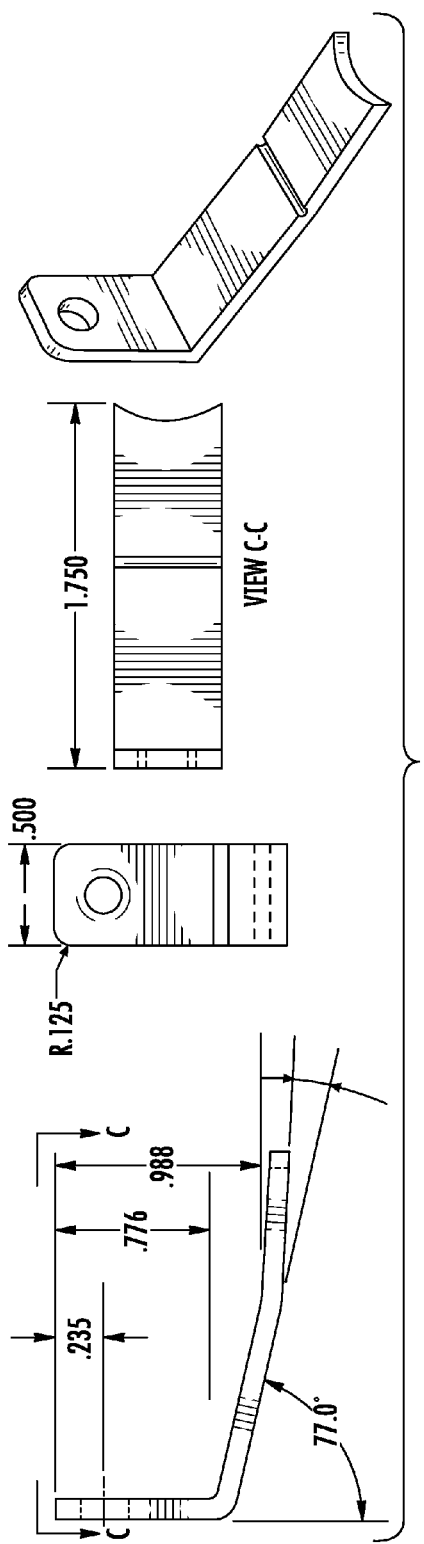

The claw member 30 has a lateral portion 32 threadably mounted on the vertical bolt 20 and is also provided with an upstanding retainer portion 34. FIG. 16 illustrates some possible, non-limiting dimensions of the claw member. FIG. 4 illustrates the vertical bolt and claw in more detail.

Figure 9A:
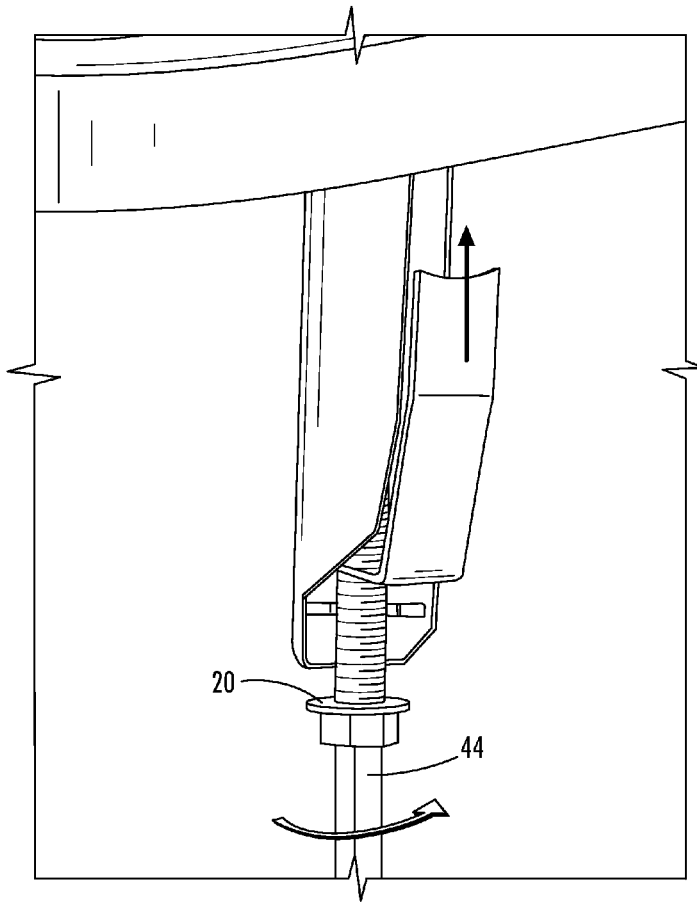
FIGS. 9a to 9c illustrate the operation of FIG. 9d.
Figure 9B:
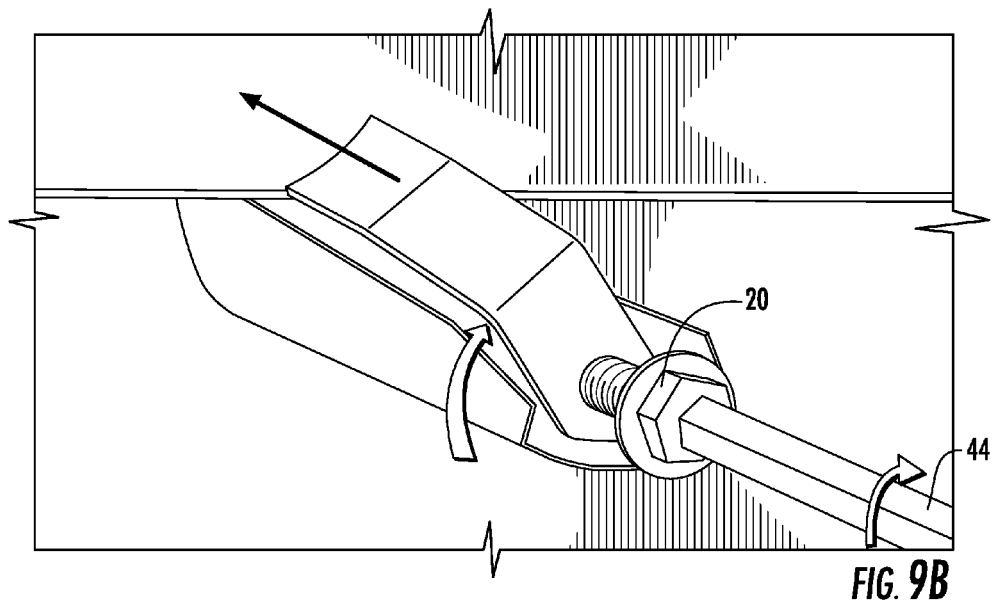
Figure 9C:
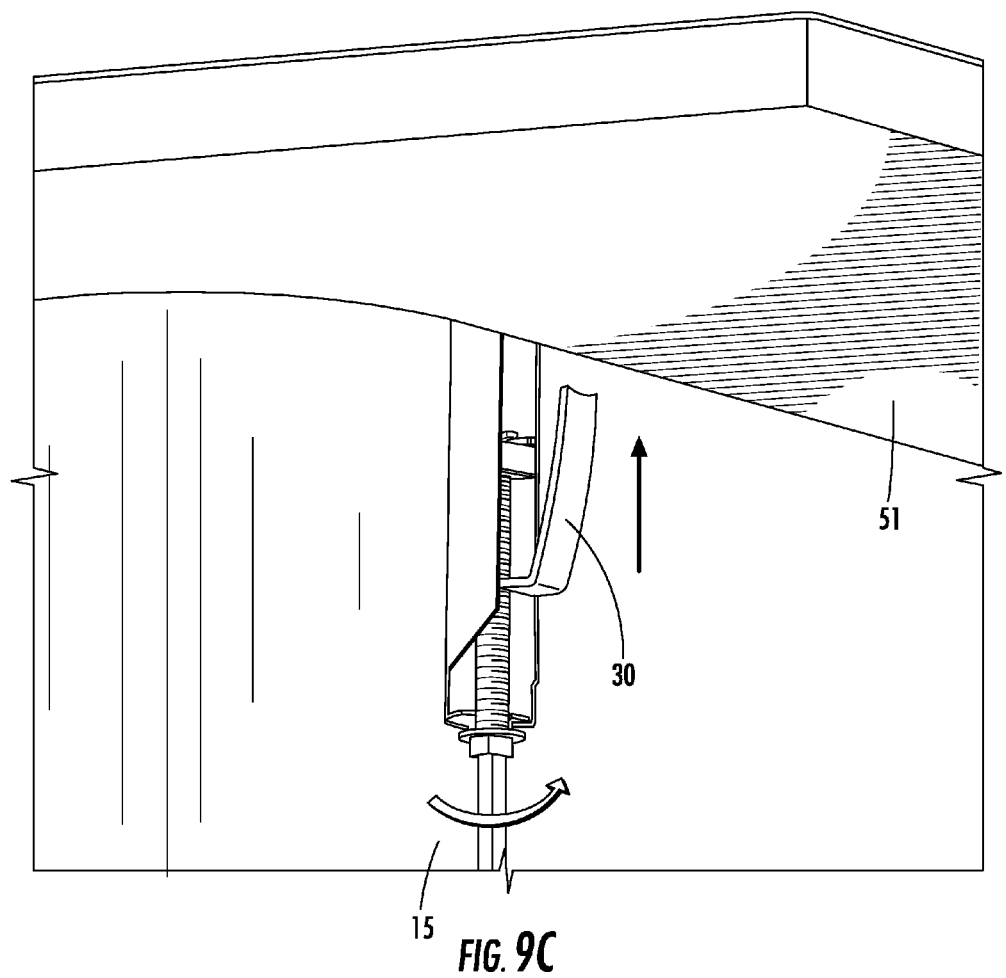

In use, rotation of the vertical bolt 20 causes the claw member 30 to rise up the bolt 25 to engage an underside of the countertop 51. This is best illustrated in FIG. 9c.

In a lower disengaged position the claw member 20 is free to turn about a vertical axis into a retracted position wherein the claw member 30 lies under the flange 52 to permit insertion of the sink unit 50 into the countertop 51 opening. This is best seen in FIG. 5b. In this position, the claw member cannot rotate about the axis of the vertical bolt. There are two advantages of this retracted and constrained position of the claw member. Firstly, since it cannot rotate freely about the axis of the vertical bolt, the claw member will not interfere with insertion of the sink into the opening of the countertop as illustrated in FIGS. 5b and 6. Secondly, since the claw member retracted position is predictable, the opening in the countertop can be reduced to a minimum thereby ensuring maximum contact area for sealant between the underside of the sink flange and the countertop.

As seen in FIG. 5b, the sink unit 50 with sink fasteners 10 is passed freely through the cut out in the countertop 51. At this time, the claw member 30 is mechanically locked in position parallel to the bowl wall of the sink unit 50, as seen in FIG. 6.

Figure 10:
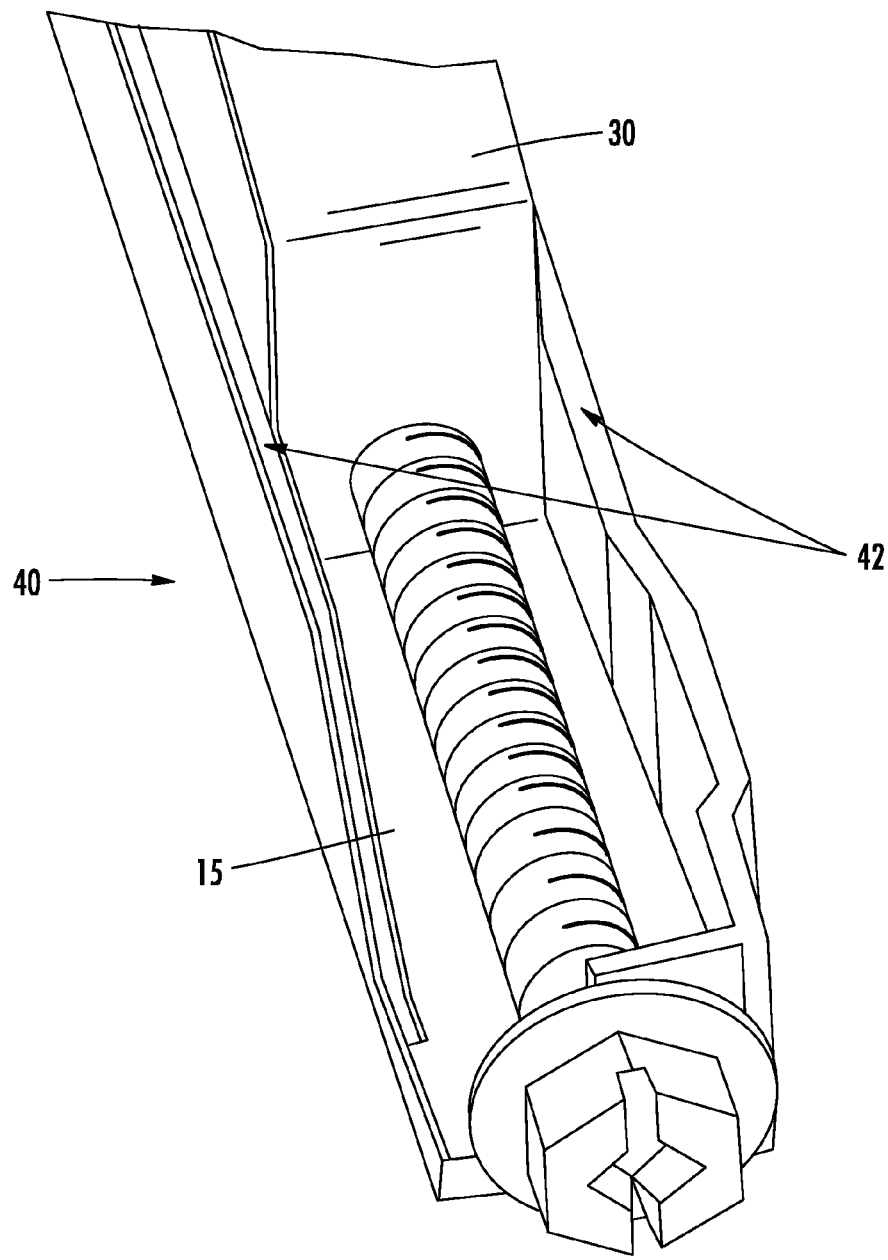
FIG. 10 illustrates one embodiment of a guide member of the sink fastener of FIG. 1.

In one embodiment seen in FIG. 10, the sink fastener 10 also includes a guide member 40 for constraining the movement of the claw member 30 so that as the claw member 30 rises up the vertical bolt 20 the claw member 30 turns about the vertical axis into an outwardly extended position for engagement with the underside of the countertop 51.

In one embodiment, the guide member 40 is in the form of side walls 42 that guide the claw member 30 during rotation. Advantages of this include that the claw member 30 is stabilized for one handed operation. The side walls 42 guide the claw member 30 during travel and stabilize the claw member 30 for one handed operation.

Figure 8:
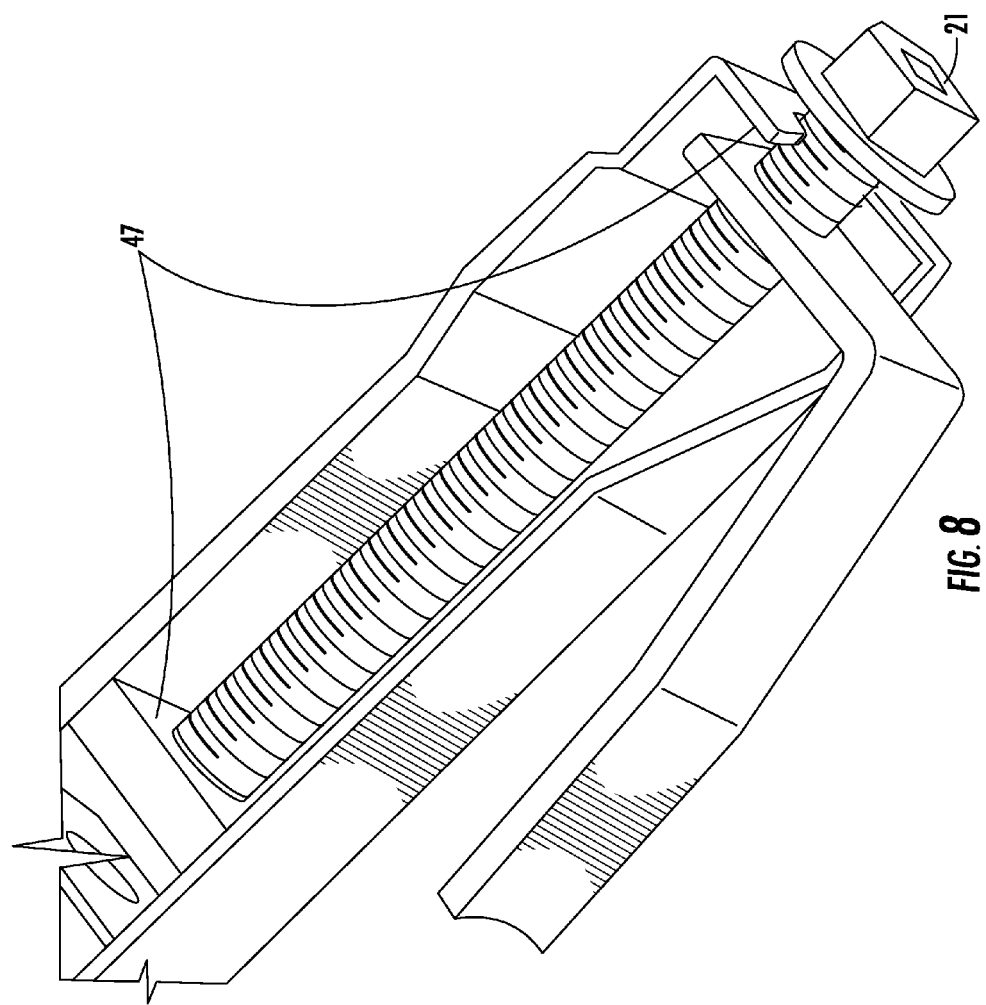
FIG. 8 illustrates a close-up of one embodiment of a frame of the sink fastener of FIG. 1.

It can be seen in FIG. 8 that preferably the threaded vertical bolt 20 is fixed in position at both ends 47 of the frame 15. Referring to FIGS. 9a and 9b, preferably when the sink unit 50 is in the countertop 51 opening, the threaded vertical bolt 20 is rotated to move the claw member 30. Preferably this is done using either a power drill with bit or a screwdriver 44. When the sink unit 50 is in the countertop 51 and ready for mounting, a torque is applied to the threaded bolt 20. This forces the plated claw member 30 to advance upward toward the underside of the countertop 51. During claw member 30 advancement, the claw member 30 mechanically rotates about the axis of the vertical bolt and locks in the outbound, perpendicular position. The frame 15 stabilizes bolt head 21 of bolt 20, holds claw member 30 in position for dropping sink unit 50 through a hole in countertop 51 and holds bolt head 21 off sink unit 50 for easy nut driver 44 access. FIGS. 9a and 9b illustrate that the applied torque is clockwise, but either a clockwise or a counterclockwise torque can be used.

Figure 9D:
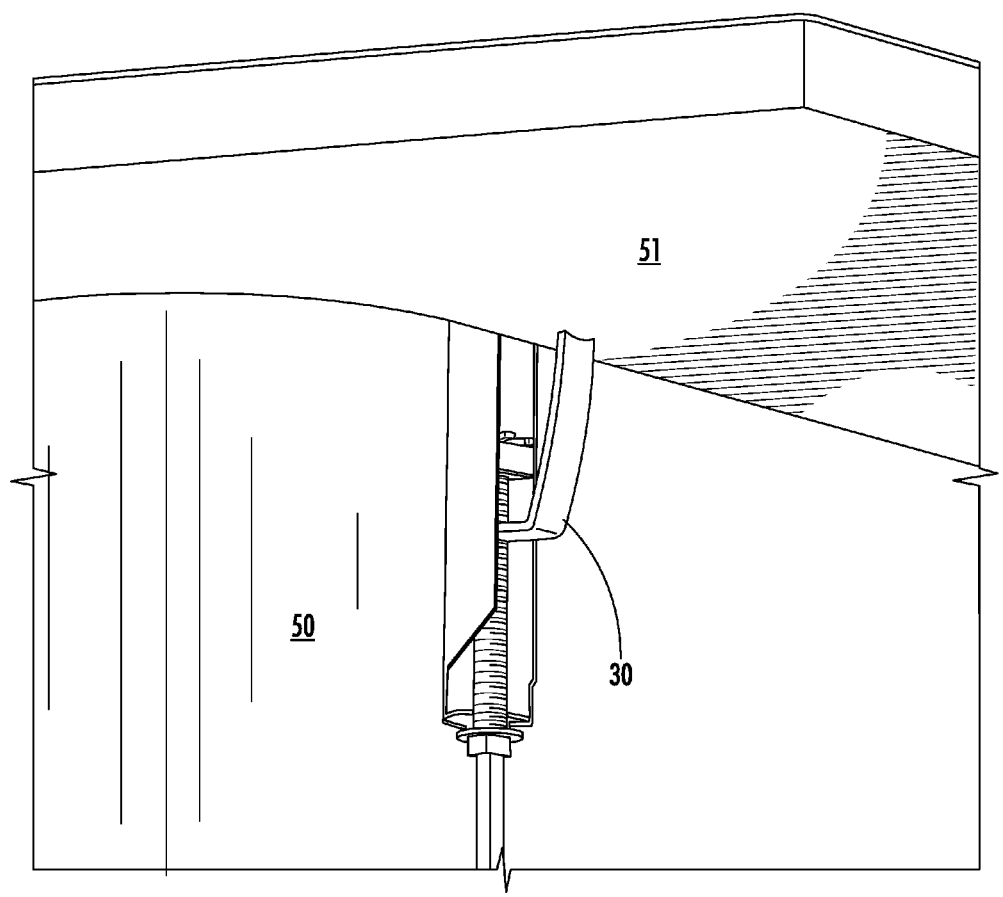

As seen in FIGS. 9c and 9d, the claw member 30 will remain in rotated, perpendicular position as it advances towards the underside of the countertop 51. FIG. 9d illustrates one sink fastener 10 in position to hold the sink unit 50 down to the countertop 51.

Figure 11:
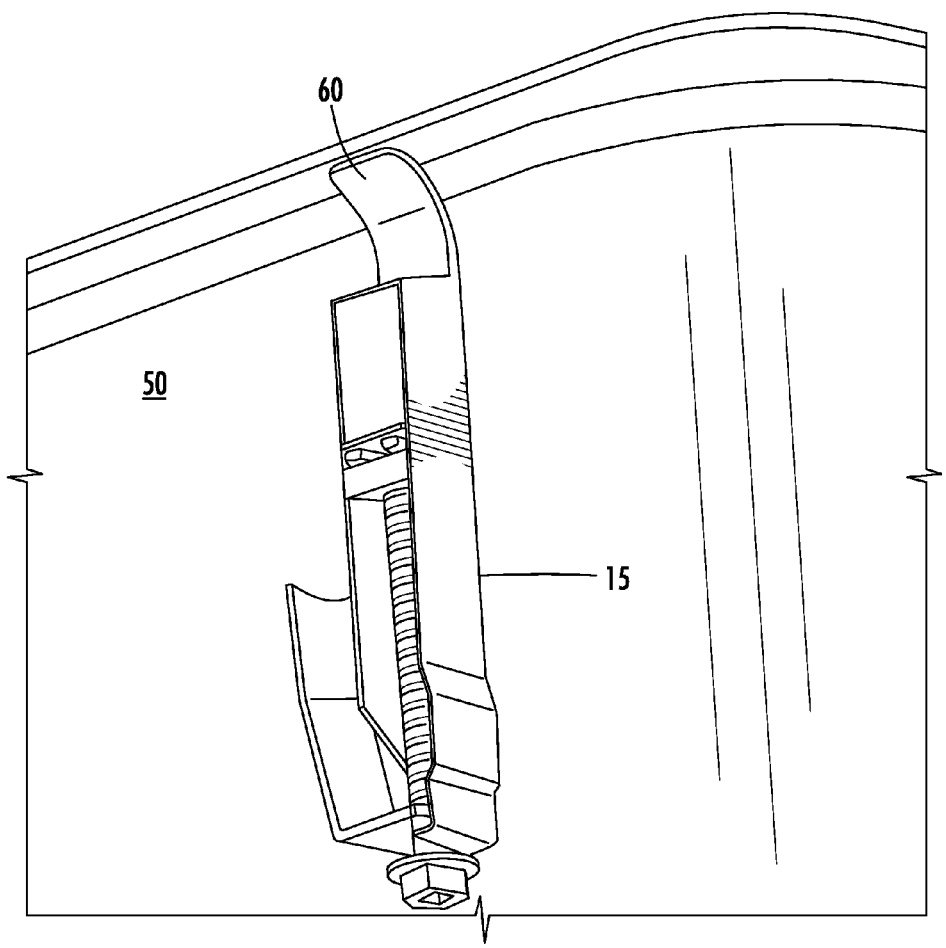
FIG. 11 illustrates one embodiment of a sink fastener in accordance with the teachings of this invention.
Figure 12A:
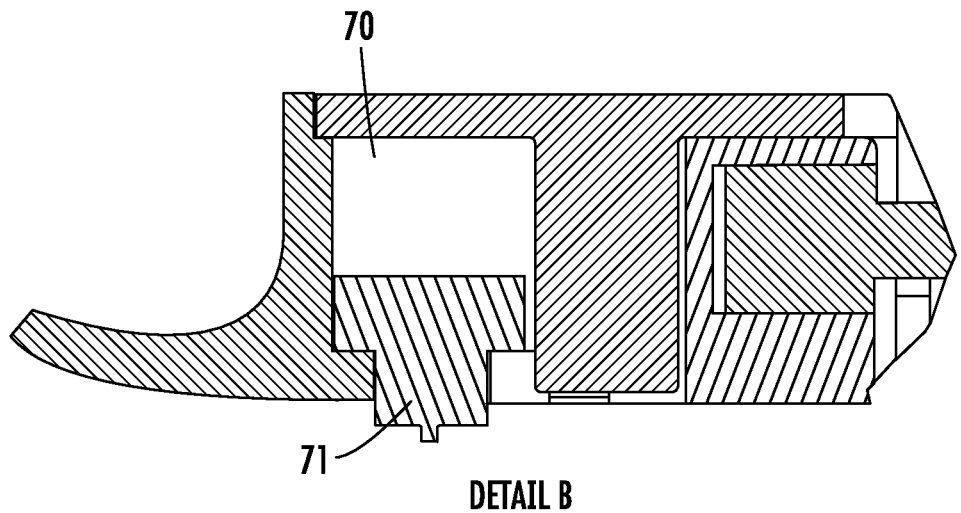
FIGS. 12a to 12c illustrate details of FIGS. 7a to 7e.
Figure 12B:
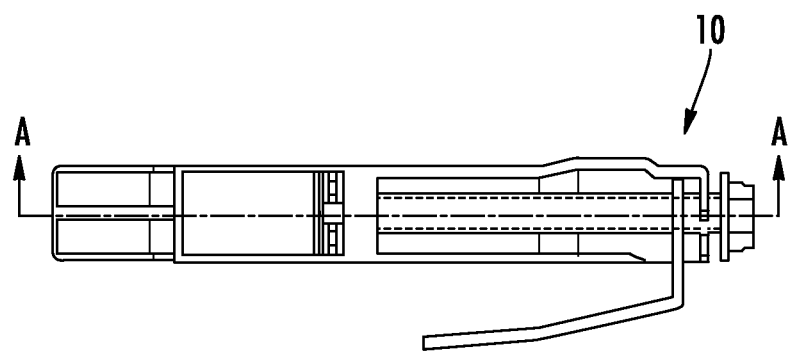
Figure 12C:
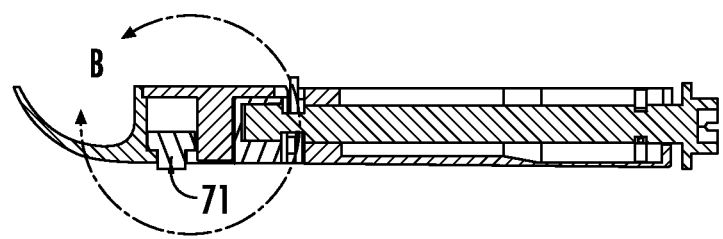

In one embodiment of FIG. 11, the frame 15 further comprises a spring tab 60 at an upper end thereof to register against the flange 52 of sink unit 50 to ensure that the fastener 10 remains in position in transit and sink installation. In particular, the frame 10 can be designed to be registered against the sink flange 52 radius under tension to hold the fastener 10 in vertical position.

Figure 7A:
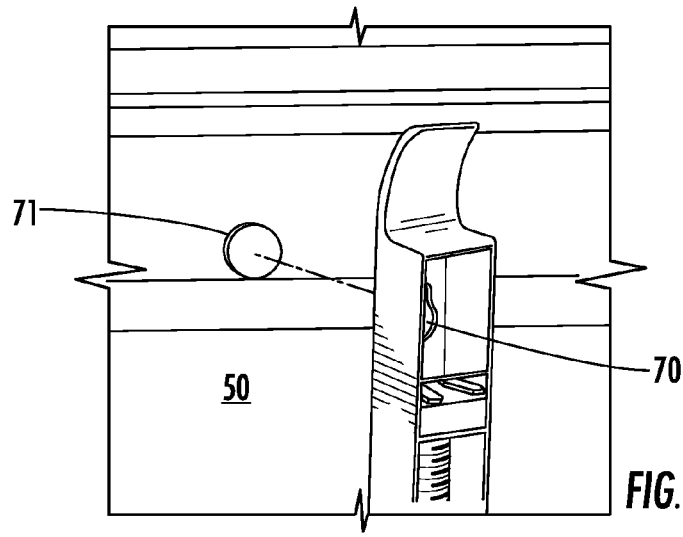
FIGS. 7a to 7e illustrates one method of how to obtain the assembly of FIG. 6.
Figure 7B:
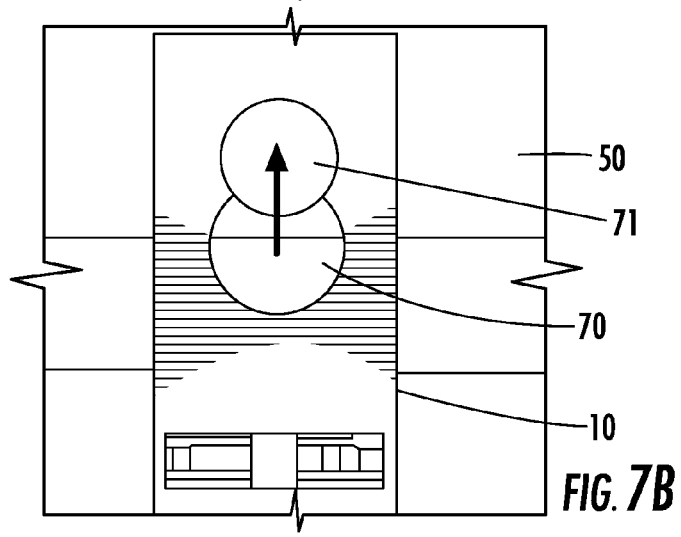
Figure 7C:
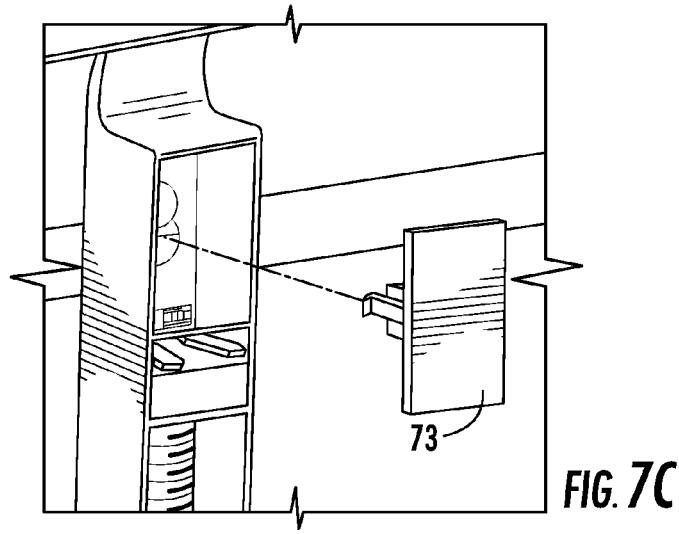
Figure 7D:
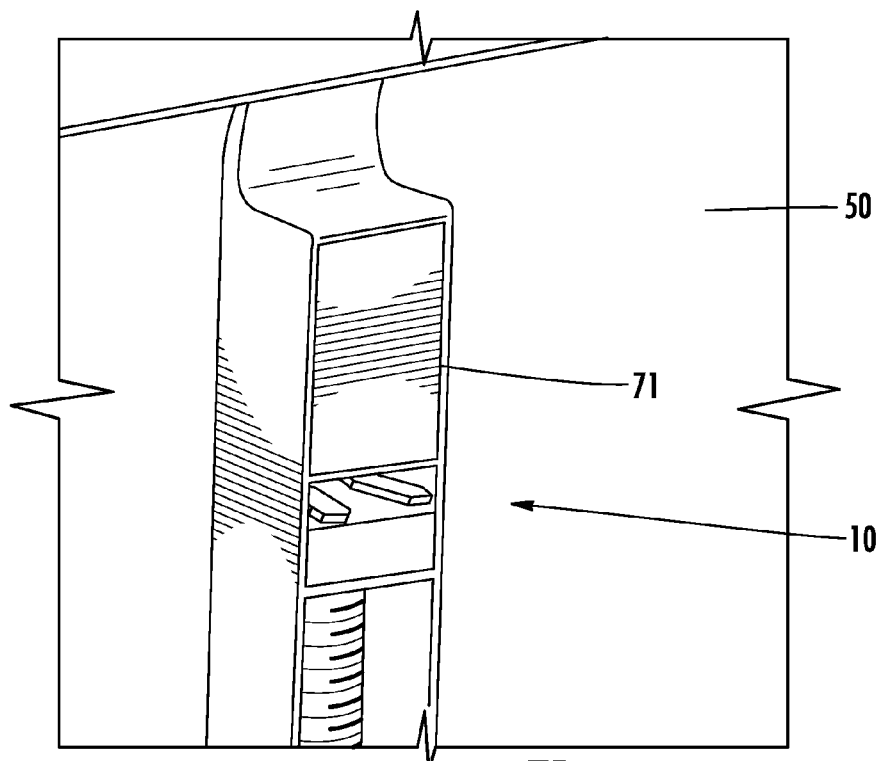
Figure 7E:
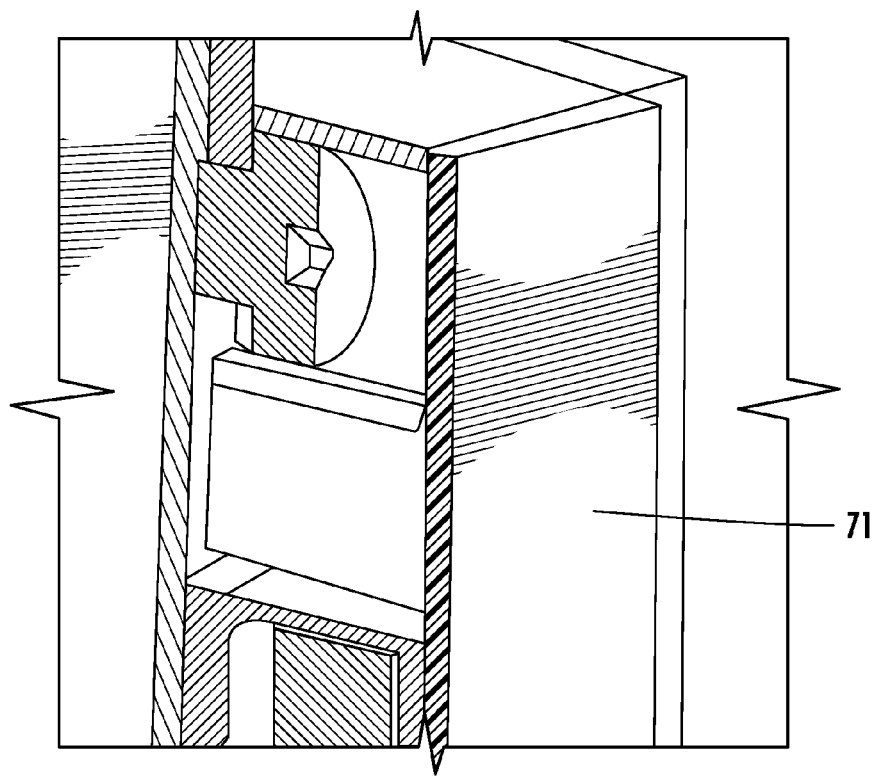
Figure 13A:
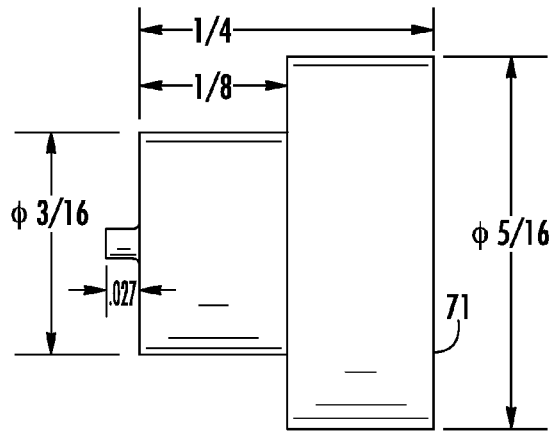
Figure 13B:
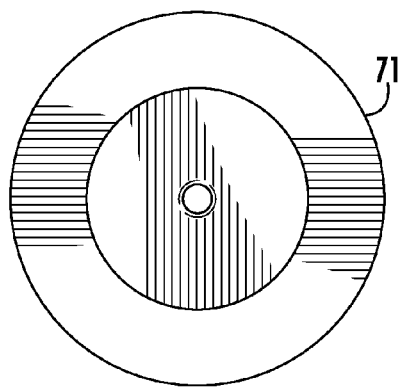
Figure 13C:
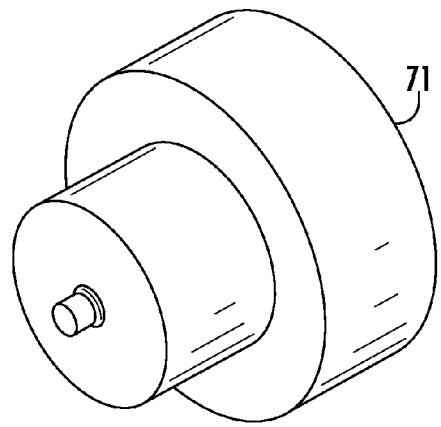
Figure 15A:
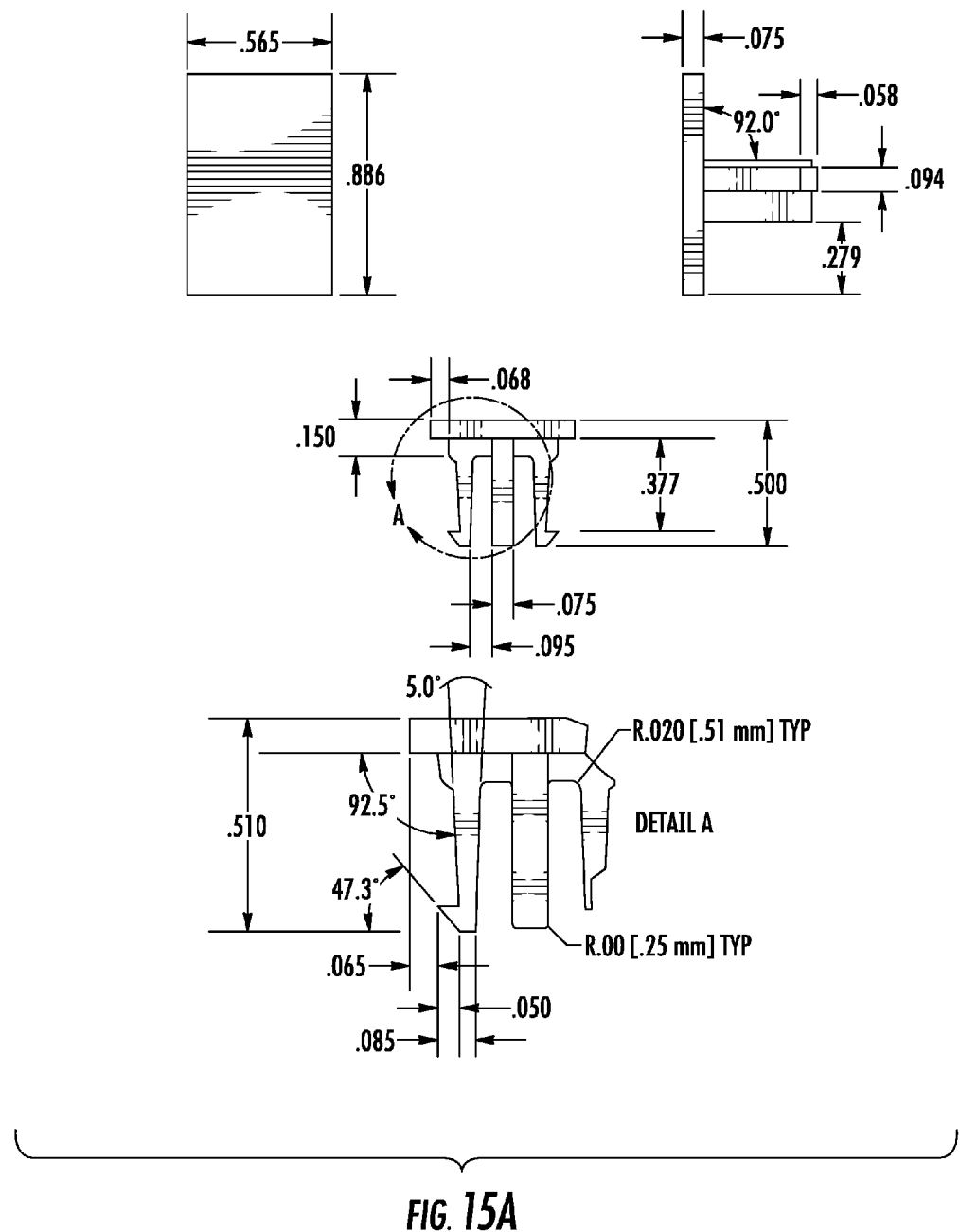
Figure 15B:
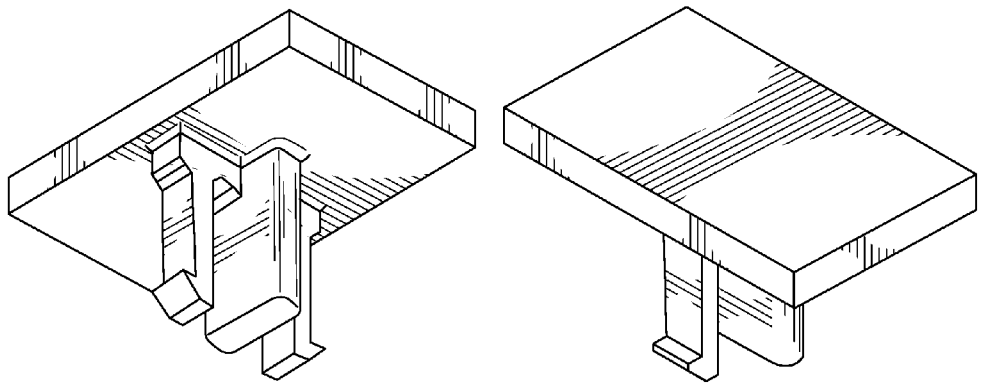

Preferably the sink fastener 10 is factory installed to the sink unit 50 to provide the sink unit 50 of FIG. 5a. In one embodiment to mount the sink fasteners 10 to the sink unit 50, as seen in FIG. 7a the frame 15 has a keyhole 70 therein which corresponds in size and shape to a keyhole stud 71 fixed to the bowl wall of the sink unit 50. FIGS. 13a, 13b, 13c illustrate some possible dimensions of the keyhole stud 71. The frame keyhole 70 receives the keyhole stud 71 so that the frame 15 of the sink fastener 10 is attached to the sink unit 50, as seen in FIG. 7b. A stud retention clip 73 is used to lock the attached sink fastener 10 in place as seen in FIG. 7c and FIGS. 12a, 12b, 12c. FIG. 15A-B illustrates some possible dimensions for the stud retention clip 73. Advantages of using a stud retention clip 71 include prevention of the fastener 10 falling off during installation and/or transit. FIGS. 7d and 7e illustrate a sink fastener 10 attached to the sink unit 50.

Advantages of this embodiment include simplified sink installation and a reduction in on-site installation labor (eliminates the step for installer).

Numerous modifications may be made without departing from the spirit and scope of the invention as defined in the appended claims.

The invention claimed is:

1. A sink fastener for fastening a sink unit with an outer flange within an opening in a countertop, comprising:
   a frame for attachment to a bowl wall of the sink unit;
   a threaded vertical bolt rotatably mounted at a fixed vertical height within the frame such that a vertical position of the threaded vertical bolt remains unchanged as the threaded vertical bolt is rotated and wherein the bolt is fixed at both ends within the frame to permit one-handed operation;
   a claw member having a lateral portion threadably mounted on the vertical bolt and an upstanding retainer portion, wherein rotation of the vertical bolt causes the claw member to rise up the bolt to engage an underside of the countertop, and wherein in a lower disengaged position the claw member is free to turn about a vertical axis into a retracted position wherein the claw member lies constrained under the flange to permit insertion of the sink unit into the countertop opening; and
   a guide member for constraining movement of the claw member, the guide member including a ramp so that as the claw member rises up the bolt, the ramp guides rotation of the claw member to turn about the vertical axis into an outwardly extended position for engagement with the underside of the countertop.

2. The sink fastener of claim 1, wherein when the sink unit is in the countertop opening, the threaded vertical bolt is rotated to move the claw member.

3. The sink fastener of claim 1, wherein the frame has a keyhole corresponding to a keyhole stud on the sink unit bowl wall to permit attachment of the frame to the wall of the sink unit.

4. The sink fastener of claim 3, wherein a stud retention clip is used to lock the attached sink fastener in place.

5. The sink fastener of claim 1, wherein the bolt is adapted to be rotated using either a power drill with bit or a screwdriver.

6. The sink fastener of claim 1, further comprising a spring tab at one end of the frame to register against a sink bowl aperture radius under tension to hold the fastener in a vertical position.

7. The sink fastener of claim 1, wherein the guide member comprises side walls that guide the claw member during rotation of the vertical bolt thereof.

8. The sink fastener of claim 1, wherein the sink fastener is factory installed to the sink unit.

9. The sink fastener of claim 8, wherein a plurality of the sink fasteners mounted to the sink unit.

10. The sink fastener of claim 1, wherein the threaded vertical bolt is vertically fixed in position at both ends of the frame.

\* \* \* \* \*